United States Patent [19]

Ackerley et al.

[11] Patent Number: 5,677,500
[45] Date of Patent: Oct. 14, 1997

[54] PRESSURE REDUCTION SYSTEM TESTING

[75] Inventors: Robert Ackerley, Warwickshire; Anthony David Raybould, Coventry, both of United Kingdom

[73] Assignee: British Gas plc, London, United Kingdom

[21] Appl. No.: 516,925

[22] Filed: Aug. 18, 1995

[30] Foreign Application Priority Data

Sep. 9, 1994 [GB] United Kingdom ............... 9418163

[51] Int. Cl.$^6$ .................... F17D 1/04; G05D 16/20; F16K 37/00
[52] U.S. Cl. .................. 73/865.9; 73/4 R; 364/551.01
[58] Field of Search .................... 73/865.9, 4 R, 73/3, 37; 364/551.01

[56] References Cited

U.S. PATENT DOCUMENTS

| | | | |
|---|---|---|---|
| 3,946,595 | 3/1976 | Carlson | 73/37 |
| 4,430,886 | 2/1984 | Rood | 73/37 |
| 4,668,948 | 5/1987 | Merkol | 73/37 X |
| 4,825,198 | 4/1989 | Rolker et al. | 340/605 |
| 4,903,529 | 2/1990 | Hodge | 73/37 X |
| 4,941,113 | 7/1990 | Dundics et al. | 73/112 X |
| 5,106,546 | 4/1992 | Sautkemp et al. | 73/37 X |
| 5,193,406 | 3/1993 | Wolf et al. | 73/865.9 |
| 5,265,464 | 11/1993 | Coron et al. | 73/37 X |
| 5,339,678 | 8/1994 | Haselmaier, Sr. | 73/37 X |

FOREIGN PATENT DOCUMENTS

| | | |
|---|---|---|
| 0 284 785 | 10/1988 | European Pat. Off. . |
| 2 345 689 | 3/1974 | Germany . |
| 1 387 345 | 3/1975 | United Kingdom . |
| 2 240 849 | 8/1991 | United Kingdom . |
| 2 252 848 | 8/1992 | United Kingdom . |

Primary Examiner—Thomas P. Noland
Attorney, Agent, or Firm—Oblon, Spivak, McClelland, Maier & Neustadt, P.C.

[57] ABSTRACT

A fluid pressure reduction system includes two streams, each stream having pressure regulators 19 & 20, 32 & 33. Isolation slam shuts 16 and 30 are provided in respective streams. A sequence tester 40 allows a sequence of test operations to be effected such that the slam shuts can be opened and closed and the working pressure settings to the regulators can be changed to check system integrity. These tests can be effected without interrupting the supply of gas through the system. It is also possible to carry out the sequence from another location.

12 Claims, 7 Drawing Sheets

PRESSURE REDUCTION SYSTEM TESTING

BACKGROUND OF THE INVENTION

1. Field of the Invention

The invention relates to pressure reduction systems and more specifically to testing thereof.

2. Description of the Related Art

In gas pressure reduction systems there is a need to ensure integrity of operation.

SUMMARY OF THE INVENTION

The invention is concerned with testing the integrity and operability of major system components for safety and operational reasons.

In a preferred embodiment the arrangement provides an automatic sequence of test operations without interrupting gas supply so as to confirm the system will function as desired under any circumstances which could arise during usage.

According to the invention there is provided a fluid pressure reduction system including a plurality of streams selectable as a working stream, each stream including pressure regulation means for maintaining a selected reduced pressure and isolation means, and means for carrying out a sequence of tests thereon to determine the operability of each stream without interrupting the supply of fluid through the system.

Further according to the invention there is provided a device for carrying out a sequence of tests in a fluid pressure reduction system having a plurality of operable streams each with pressure regulation means for providing a substantially constant reduced fluid pressure and isolation means therein, said device including means for checking the operability of each stream without interrupting the supply of fluid through the system.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
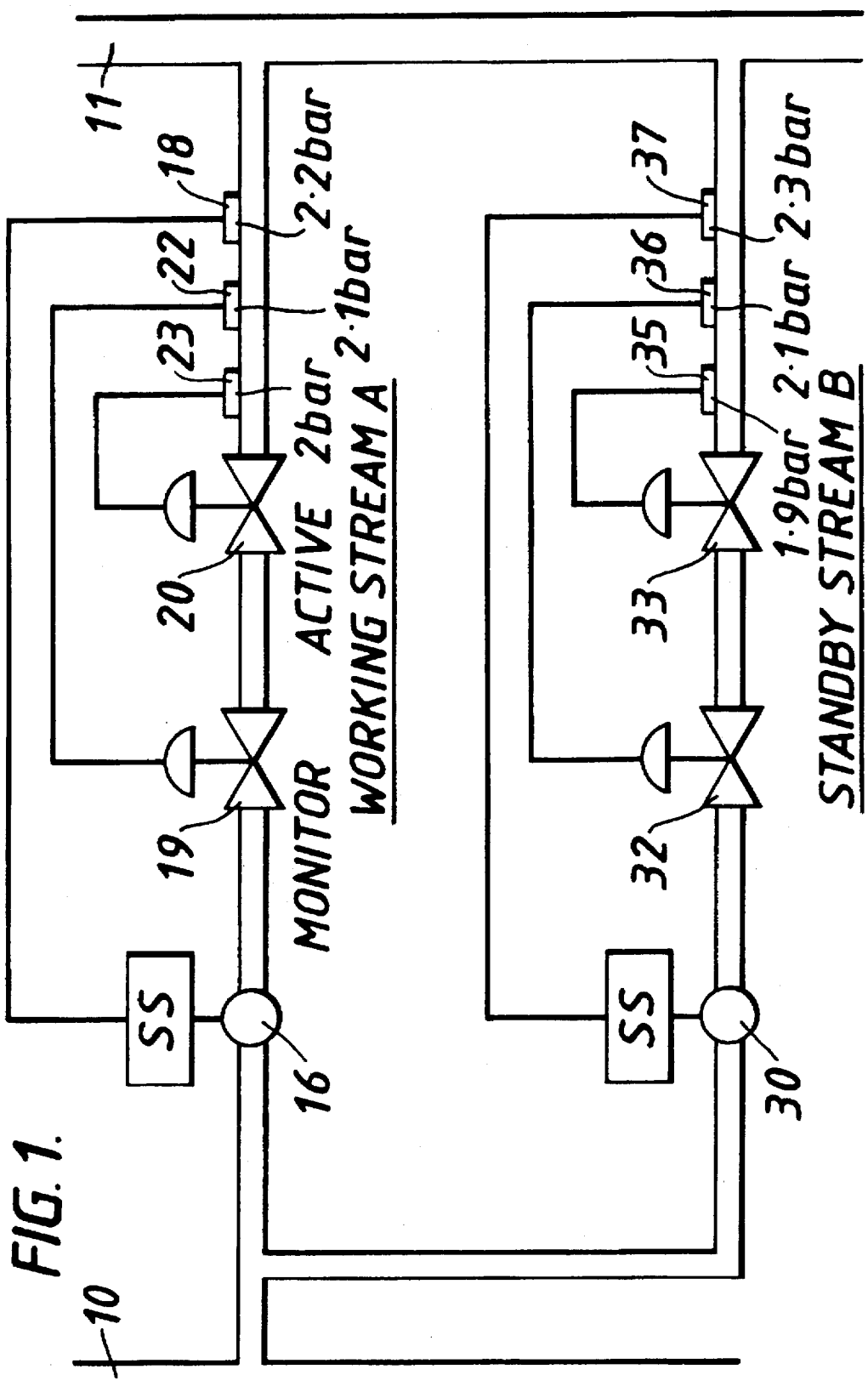
FIG. 1 shows a gas pressure reduction station.

FIG. 1 shows the major components of a pressure reduction station which handles high pressure gas (eg 70 bar) received at pipeline 10 and produces a low pressure output (eg 2 bar) to pipeline 11 for eventual use by the consumer. The gas passes through either a working stream or a standby stream, but normally through the working stream.

In the working stream the gas passes through a slam shut valve 16 operable into the shut position as a result of pressure detected by sensor 18 as described below. The gas then passes through 'monitor' valve 19 and 'active' valve 20 each having a respective pressure sensor 22 and 23 and then to the outlet pipeline 11.

The standby stream duplicates the working stream and includes valves 30–33 and associated sensors 35–37. In practice the pressure sensors in the standby stream are set to different values for reasons now described.

The working stream sensors 23, 22 and 18 are set to 2, 2.1 and 2.2 bar respectively. The aim is to provide pressure at 2 bar and this is achieved by active valve 20 which will open and close as the 2 bar value drops or is reached so this valve modulates to provide a constant 2 bar output. As the monitor valve 19 is set to 2.1 bar this will normally remain open at all times. However, if the active valve 20 becomes faulty and locked open then pressure would rise. This will be detected by sensor 22 and valve 19 will take over the modulation to provide an output of 2.1 bar, so that supply is maintained. In the unlikely event that both valves lock in the open position the pressure will rapidly rise to 2.2 bar at which point the slam shut valve 16 will activate to turn off the supply to the working stream.

The standby stream will then come into play. Normally, because active valve 33 will be set to a pressure of 1.9 (and the pressure in working stream is normally 2.0) it will always be shut—ie trying to reduce the pressure to 1.9. However, when the working stream is shut down the active valve will be able to achieve this pressure value of 1.9 and so will modulate about this point.

If valve 33 was to lock into the open position, then monitor valve 32 would begin to operate and maintain pressure at 2.1 bar. A pressure rise due to a fault with this valve remaining fully open will cause slam shut 30 to operate at 2.3 bar. This would effectively shut down the whole pressure reduction system as the working stream is also shut. The valves in such a system typically operate pneumatically.

In practice because working stream A (beyond active valve 20) is in effect connected to standby stream B up to valve 33 via pipeline 11 and therefore any gas pressure level in pipeline 11 will be present in both streams and detectable by sensors 18 and 37. Because of this, it is possible that a fault in stream B due to faults in valves 32 and 33 remaining open will cause a pressure rise and be detected by sensor 18 causing slam shut 16 to operate. However, because the fault is in standby stream B the pressure will continue to rise and cause slam shut 30 to operate thus shutting down the entire system even though there is no fault in the working stream A.

Figure 2:
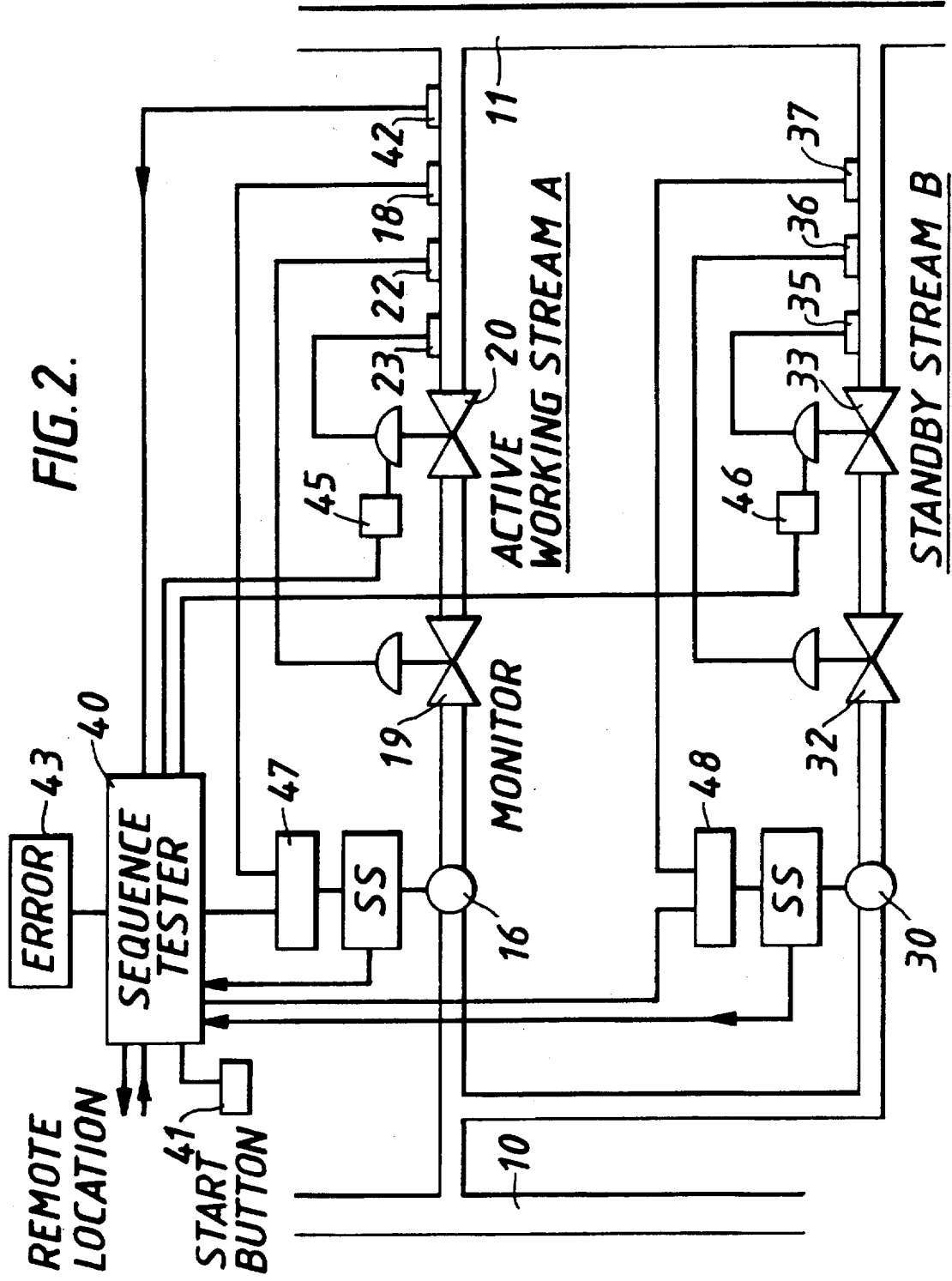
FIG. 2 shows the station with a sequence testing arrangement included.
Figure 3A:
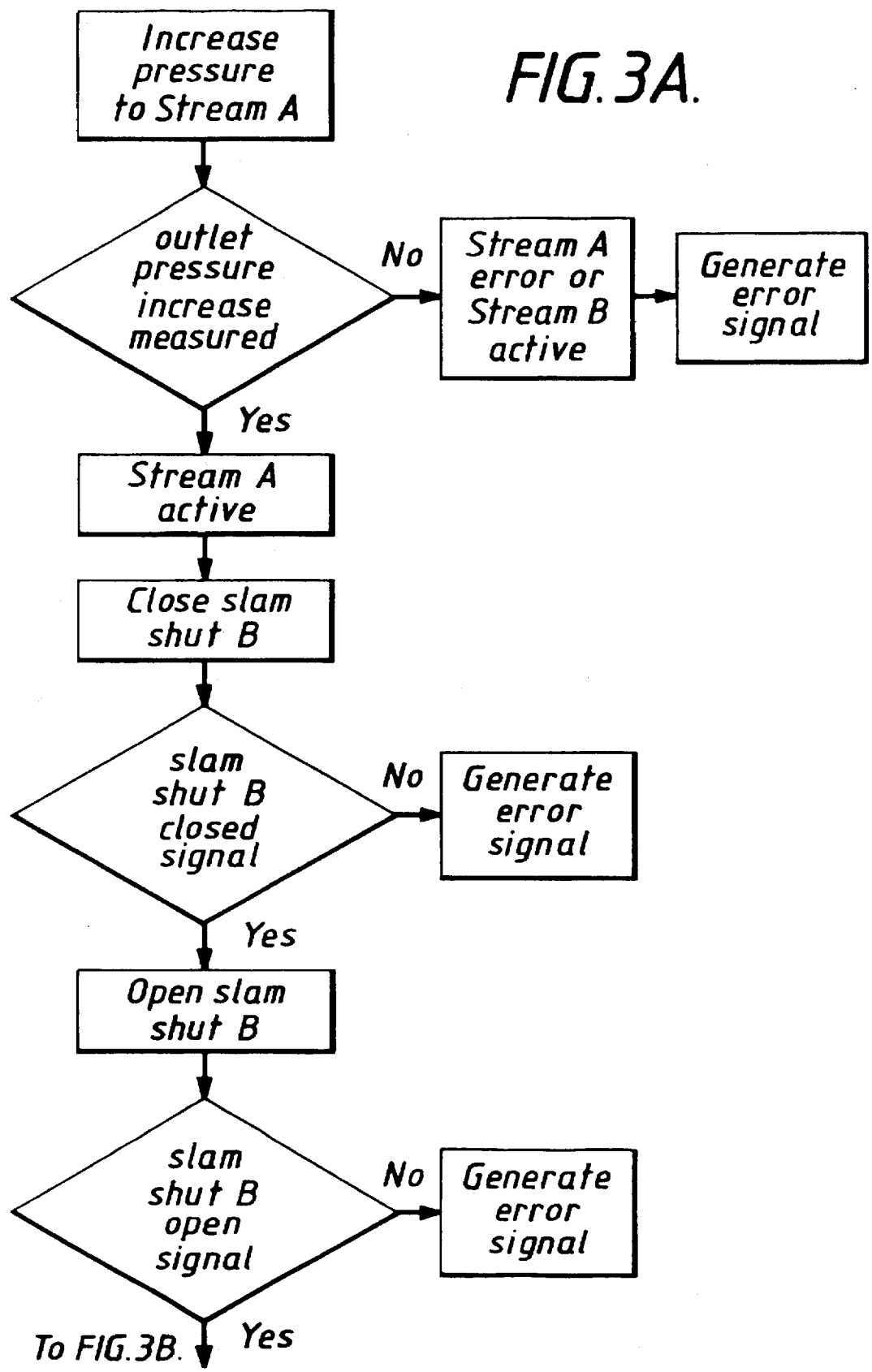
FIG. 3 (a, b & c) shows a flow chart associated with the testing sequence.
Figure 3B:
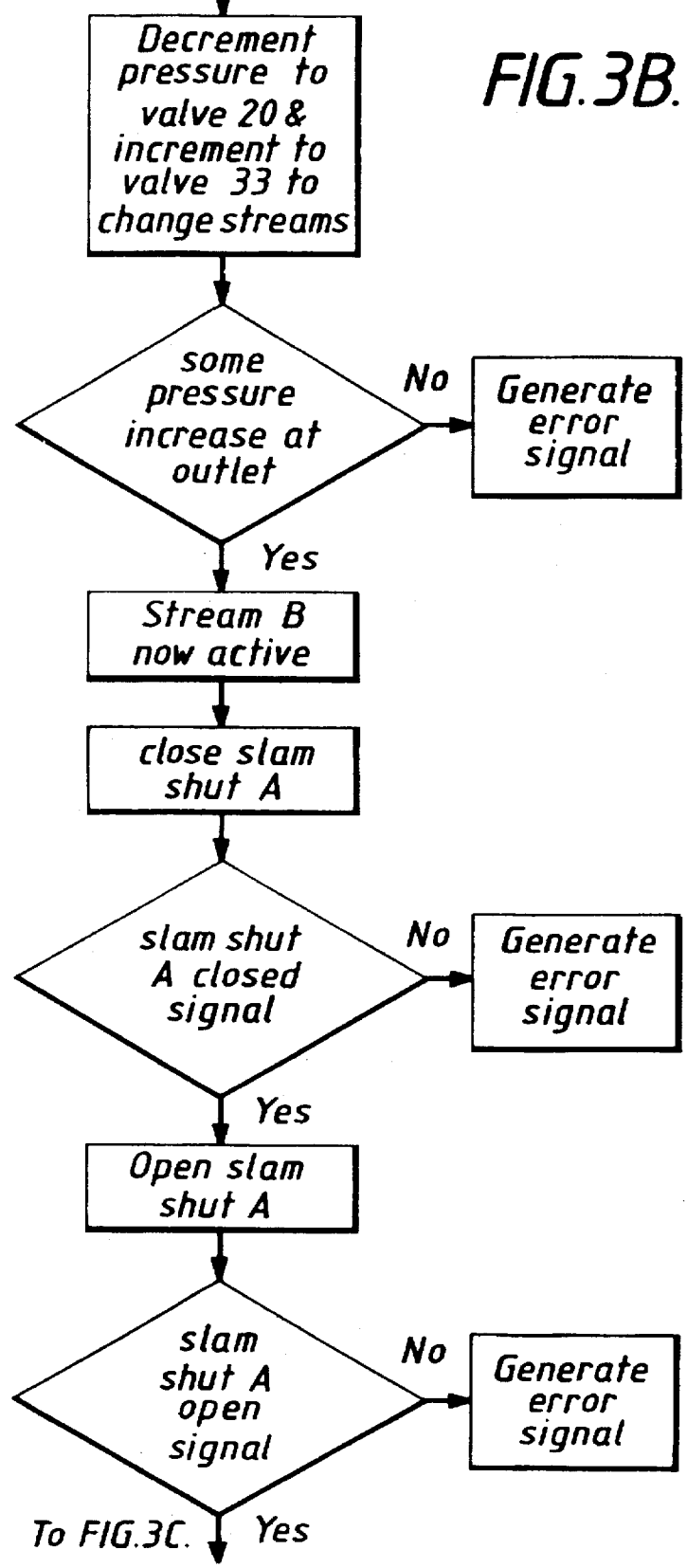
Figure 3C:
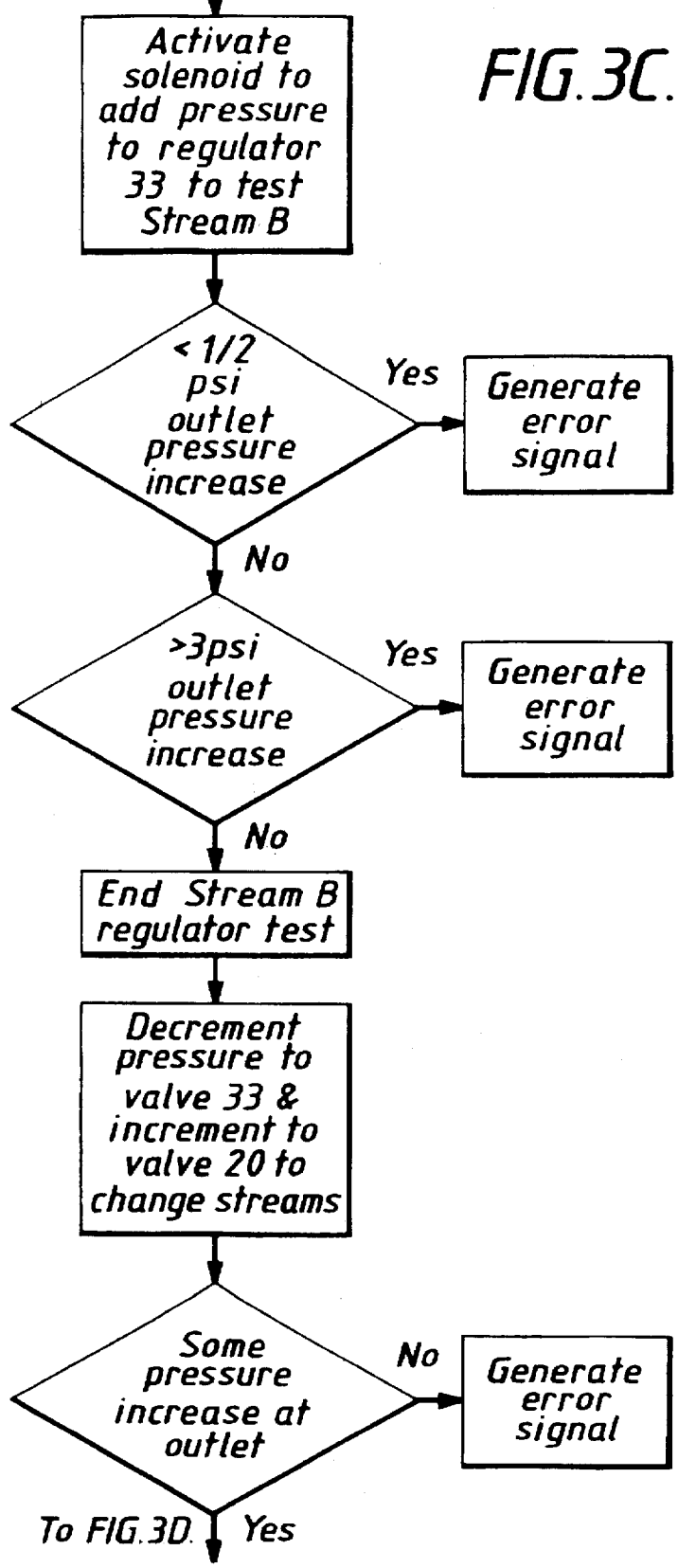
Figure 3D:
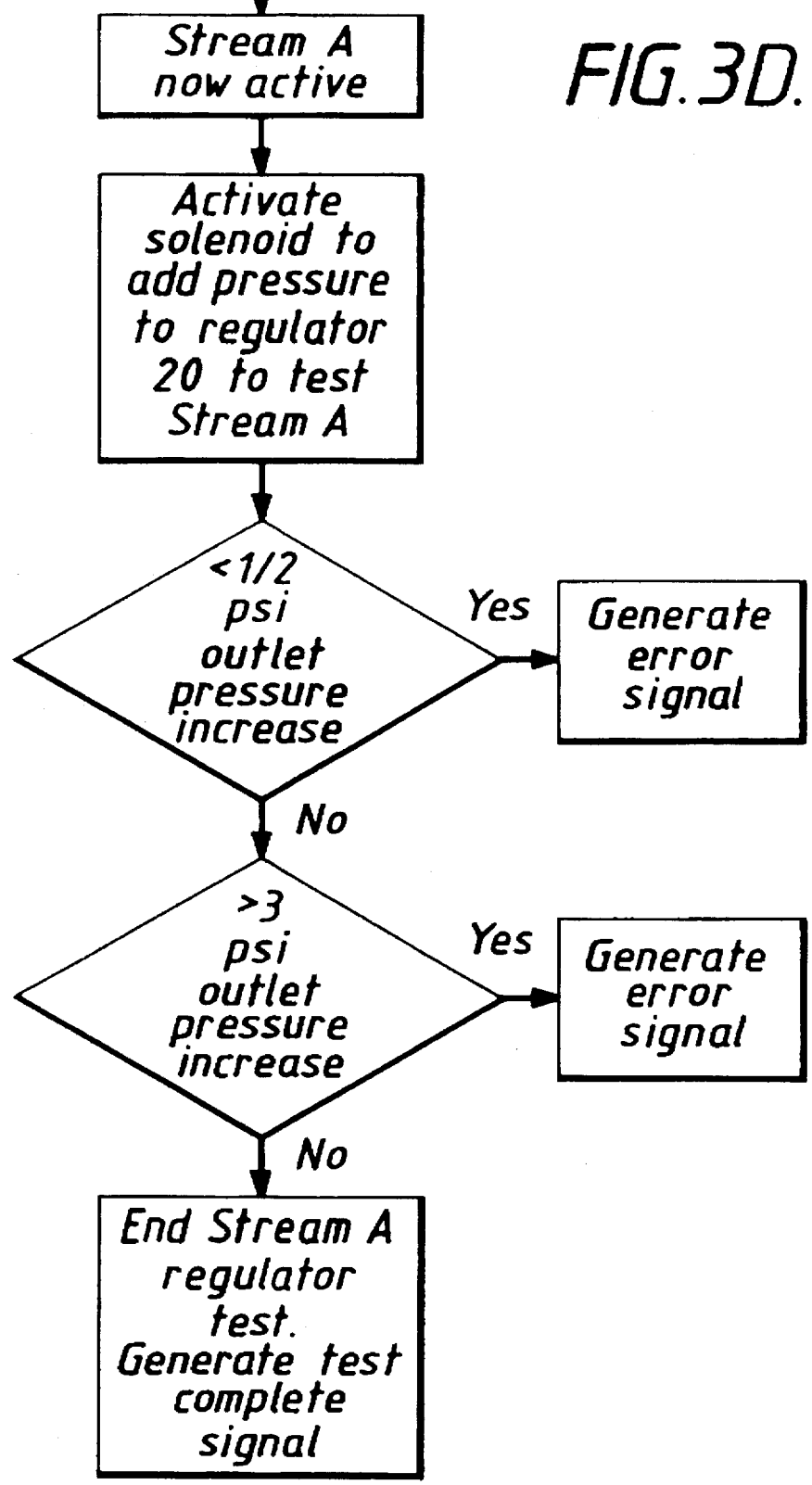

In the arrangement shown in FIG. 2, the system has been modified to include a sequence testing arrangement to allow the integrity of the system to be confirmed, the sequence of tests being initiated manually or via a remote link.

The system now includes the tester 40 with associated start button 41 and error display 43. A control mechanism 47, 48 is now provided with the slam shut devices 16 and 30 such that the tester can open or close each slam shut as part of the test sequence. A signal concerning the status of the slam shut is received by the tester 40.

The active valves 20 and 33 in the working and standby streams respectively now include a control mechanism 45 and 46 respectively which allows the tester to adjust the pressure level at which these valves operate and hence the stream output pressure. A pressure sensor 42 is provided for the tester 40 to allow the pressure at the output of stream A and hence in pipeline 11 to be continuously monitored.

Normally the stream A will be the working stream and hence an increase in the outlet pressure will follow an increase in the pressure setting of active valve 20 (via adjustment mechanism 45). No increase will arise if stream B is active or there is an error in stream A.

Because of the difference in normal pressure settings between valves 19 and 20 (and 32 and 33) the pressure change via adjustment mechanism 45 (and 46) will in practice allow both valves in a stream to be checked.

The step sequence employed (see FIG. 3) will cause the various valves to operate to test the system integrity. The system is arranged to prevent both slam shuts closing at the same time during the testing sequence.

The sequence tester can be constructed from a microprocessor arrangement or programmable logic controller (PLC).

Figure 4:
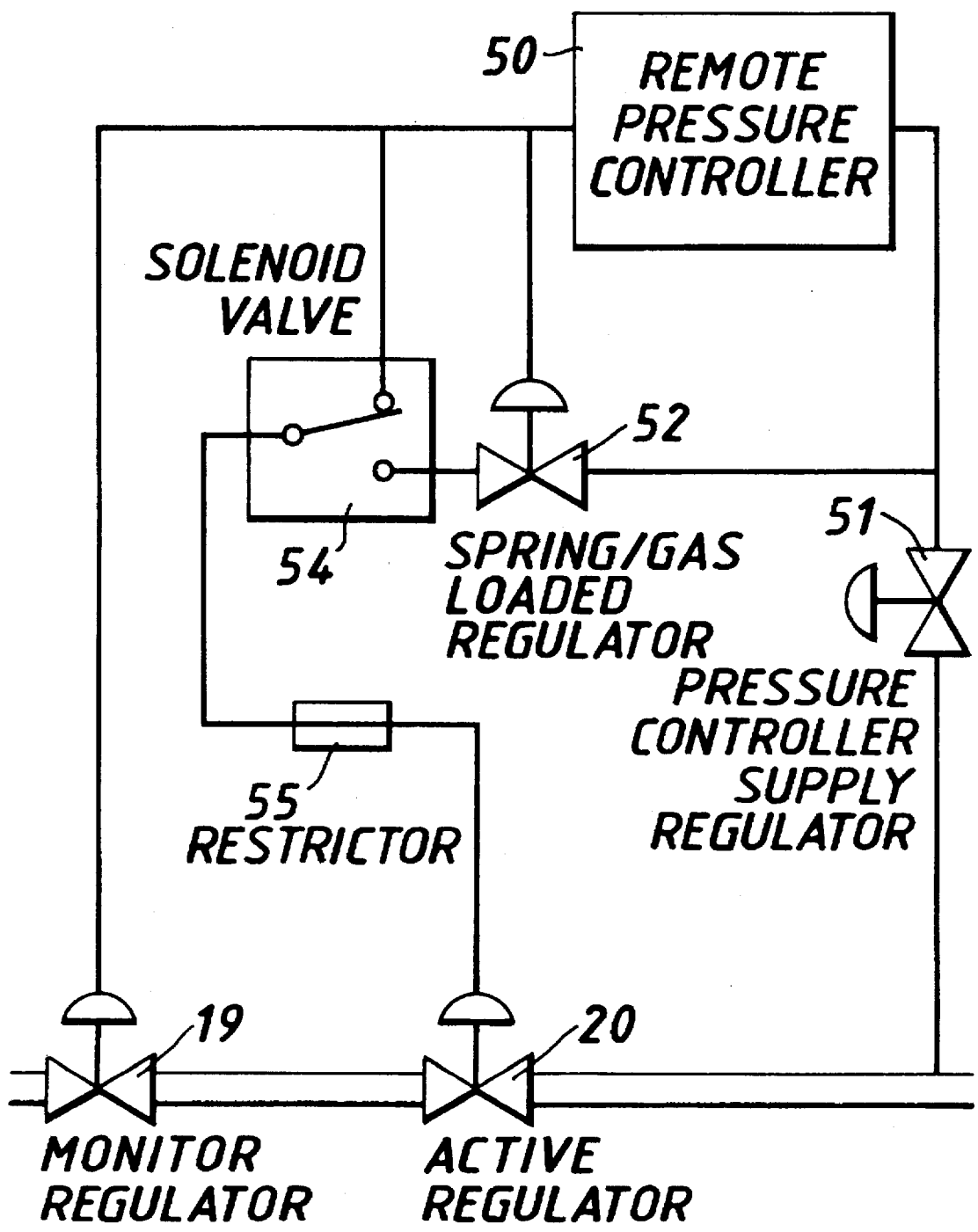
FIG. 4 shows an arrangement for valve adjustment as part of the testing process.

In practice the various valves and slam shuts will be operated pneumatically. A pneumatic switch (eg solenoid valve) will be utilised under the sequence tester control. In the case of the active regulators 20 and 33, an arrangement as shown in FIG. 4 can be employed. For the sake of clarity only part of one stream (Working Stream A) is shown.

A remote pressure controller 50 (e.g. of the type made by Watson and Smith) is provided with associated supply regulator 51 and spring gas loaded regulator 52. A solenoid valve 54 connects to the active regulator 20 via restrictor 55. The controller 50 allows the regulators to be set to a variable operating pressure which comprises a preset spring loaded pressure and a selectable gas pressure which in combination provides the total operating pressure.

Hence the configuration is utilised to provide the control mechanism 45 of FIG. 2. A test pressure is introduced to active regulator 20 and this can cause it to raise its working pressure level above that of the monitor regulator valve 19 working pressure thereby reversing their roles so allowing testing of both valves. If a monitor regulator should fail in the open position the active regulator will continue to control at the higher pressure.

Because the pneumatic system will take a short period to stabilise between operations, the sequence tester 40 can be set to provide appropriate delays in the testing sequence. The sequence tester can be arranged to sense more than one pressure with the use of additional sensors. Thus it can read the gas loading pressure on each stream plus the outlet pressure of the station (as above). The transducers can give an output which is directly in digital form by means of an appropriate digital word. If the transducers are of the type that give an analog voltage, this can be changed into digital form via a suitable analog to digital converter. Pressure readings can be stored within the PLC for comparison purposes during the sequence and measurement phases.

The signals indicative of the various slam shut operations and any error signals can take the form of binary information thus being handled directly by the PLC in digital form (via isolating interfacing as appropriate). Similarly the signals initiating changes in valve operation can be binary in form. Where power requirements demand these can operate via relays.

The sequence can be activated from a remote location in the event the station is unmanned and results relayed via a suitable telemetry link.

Although the system has been described in relation to two streams, with modification three or more streams could be tested.

We claim:

1. A fluid pressure reduction system including a plurality of streams selectable as a working stream, each stream including automatic constant pressure regulation means for maintaining a selected reduced pressure and automatically operable stream isolation means, and test sequence means for carrying out a sequence of tests on the regulator means and isolation means to determine the operability of each stream without interrupting the supply of fluid passing through the system.

2. A system as claimed in claim 1 wherein the means for carrying out the tests includes operation means for activating said isolation means and detector means for detecting activation thereof.

3. A system as claimed in clams 1 or 2 wherein the means for carrying out the tests includes control means for varying working pressures to the pressure regulation means and detector means for detecting output pressure changes effected thereby.

4. A system as claimed in claim 1 wherein remote operation means are provided to allow the sequence of tests to be instigated from a remote location.

5. A system as claimed in claim 1 wherein the test sequence means includes pneumatic control means operatable by electronic sequencing means.

6. A device for carrying out a sequence of tests in a fluid pressure reduction system having a plurality of operable streams each with automatic constant pressure regulation means for providing a substantially constant reduced fluid pressure and automatically operable stream isolation means therein, said device including means for checking the operability of each stream including the regulation means and isolation means without interrupting the supply of fluid through the system.

7. A device as claimed in claim 6 including operation means for activating said isolation means and detector means for detecting activation thereof.

8. A device as claimed in claim 6 or 7 including control means for varying working pressures to the pressure regulation means and detector means for detecting output pressure changes effected thereby.

9. A device as claimed in claim 6 including remote operation means provided to allow the integrity of each stream to be established from a remote location.

10. A device as claimed in claim 6 including pneumatic control means operable by electronic sequencing means.

11. A method for determining the integrity of a fluid reduction system having a plurality of streams, the method including the steps of:

carrying out a sequence of tests on an automatic constant pressure regulating device and an automatically operable system isolating device in each stream, and monitoring system changes to determine the correct operation thereof.

12. A method as claimed in claim 11, wherein the test sequence is controlled from a remote location.

* * * * *